(12) United States Patent
Tracy et al.

(10) Patent No.: US 8,016,927 B2
(45) Date of Patent: Sep. 13, 2011

(54) COMPUTING DEVICE FILTER SYSTEM

(75) Inventors: Mark S. Tracy, Tomball, TX (US); Paul J. Doczy, Cypress, TX (US); Jonathan R. Harris, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 520 days.

(21) Appl. No.: 11/786,121

(22) Filed: Apr. 11, 2007

(65) Prior Publication Data

US 2008/0253088 A1      Oct. 16, 2008

(51) Int. Cl.
*B01D 46/00* (2006.01)
(52) U.S. Cl. ............. 96/420; 55/385.6; 55/470; 96/417; 96/418; 96/419; 96/422; 96/424; 361/695; 361/697
(58) Field of Classification Search ................ 55/385.6, 55/470, 471, 472, 473, DIG. 34; 96/139, 96/417–423, 424; 131/233, 235.1, 242; 454/184, 454/192; 361/695, 687, 697; 415/213.1
See application file for complete search history.

(56) References Cited

U.S. PATENT DOCUMENTS

| | | | |
|---|---|---|---|
| 5,559,673 A | 9/1996 | Gagnon et al. | |
| 5,959,836 A | 9/1999 | Bhatia et al. | |
| 6,026,888 A | 2/2000 | Moore | |
| 6,043,979 A | 3/2000 | Shim | |
| 6,104,607 A * | 8/2000 | Behl | 361/679.49 |
| 6,462,947 B1 | 10/2002 | Huang | |
| 6,544,309 B1 * | 4/2003 | Hoefer et al. | 55/283 |
| 6,567,267 B1 | 5/2003 | Wang | |
| 6,620,222 B2 * | 9/2003 | White | 95/273 |
| 6,657,859 B1 | 12/2003 | Karr | |
| 6,734,801 B2 * | 5/2004 | Scofield | 340/607 |
| 7,126,819 B2 | 10/2006 | Liang | |
| 7,261,762 B2 * | 8/2007 | Kang et al. | 95/1 |
| 7,300,485 B1 * | 11/2007 | Moore et al. | 55/385.6 |
| 2004/0077304 A1 | 4/2004 | Pfannenberg | |
| 2004/0182245 A1 * | 9/2004 | Gorin | 96/421 |
| 2005/0061155 A1 * | 3/2005 | Franey | 96/421 |
| 2006/0120045 A1 | 6/2006 | Werff | |
| 2007/0022881 A1 * | 2/2007 | Falcon | 96/421 |
| 2008/0184894 A1 * | 8/2008 | Grundelman | 96/421 |

FOREIGN PATENT DOCUMENTS

| | | |
|---|---|---|
| KR | 20-0284122 | 7/2002 |
| KR | 10-2003-0005972 | 1/2003 |
| KR | 10-2003-0086739 | 11/2003 |

OTHER PUBLICATIONS

International Searching Authority, International Search Report and Written Opinion dated Jul. 15, 2008, pp. 10.

* cited by examiner

*Primary Examiner* — Duane Smith
*Assistant Examiner* — Minh-Chau Pham

(57) ABSTRACT

A computing device having a cooling fan, a heat exchanger, and a filter disposed between the heat exchanger and the cooling fan.

18 Claims, 3 Drawing Sheets

COMPUTING DEVICE FILTER SYSTEM

BACKGROUND

Computing devices, such as laptop or notebook computers, comprise cooling systems to dissipate thermal energy generated by the computing device. Such cooling systems oftentimes include an air circulation device to force cooling air through a heat exchanger to dissipate heat from one or more computer operational components. However, in operation, dust and other unwanted particulates collect inside the cooling system and, specifically, on or inside the heat exchanger, thereby decreasing the efficiency of heat dissipation by the heat exchanger.

DETAILED DESCRIPTION OF THE DRAWINGS

Various embodiments and the advantages thereof are best understood by referring to FIGS. 1-4, like numerals being used for like and corresponding parts of the various drawings.

Figure 1:
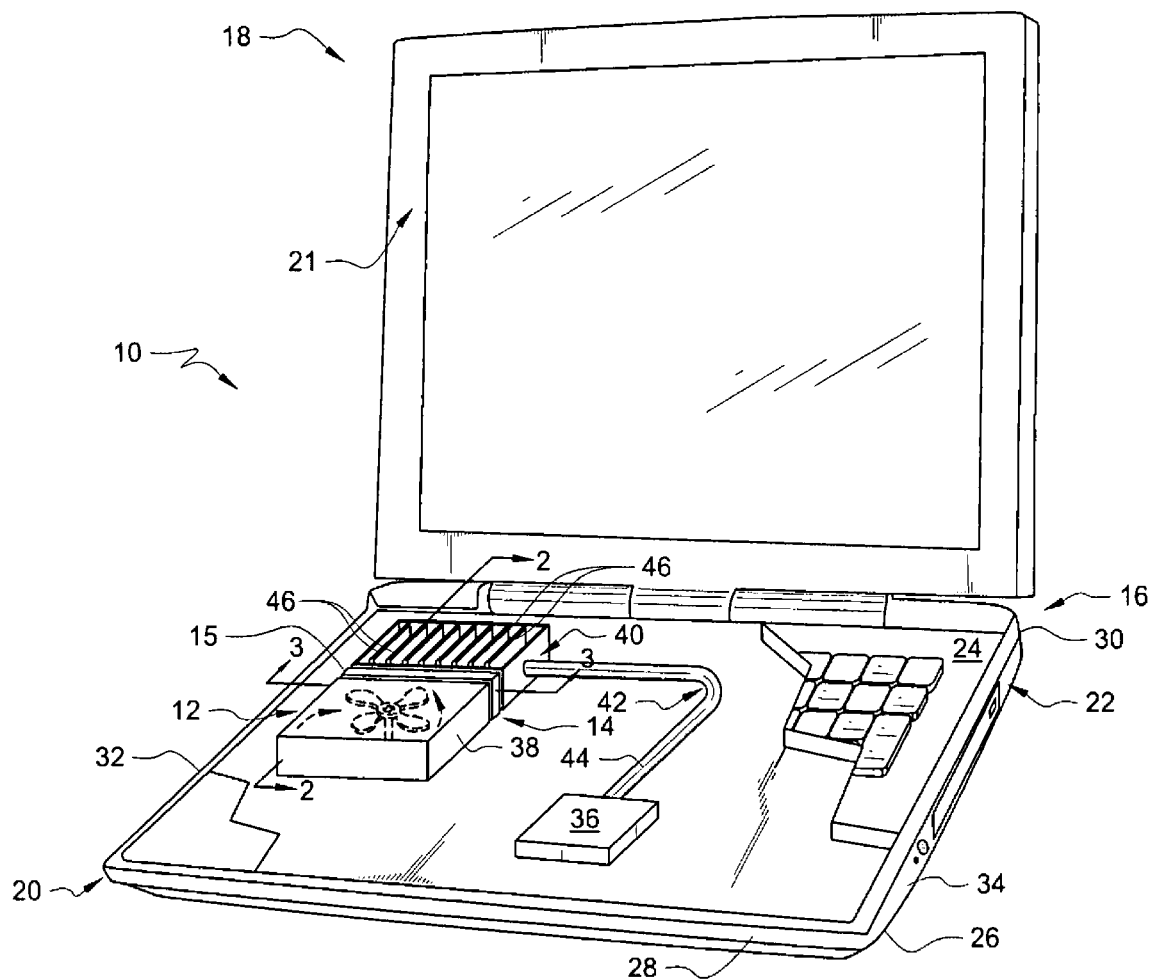
FIG. 1 is a diagram illustrating a computing device in which an embodiment of a filter system is employed to advantage.

FIG. 1 is a diagram illustrating a computing device 10 comprising a cooling system 12 in which an embodiment of a filter system 14 is employed to advantage. In the embodiment illustrated in FIG. 1, computing device 10 comprises a laptop or notebook computer 16; however, it should be understood that computing device 10 may comprise any type of computing device such as, but not limited to, a tablet personal computer, a personal digital assistant, a desktop computer or any other type of portable or non-portable computing device. In the embodiment illustrated in FIG. 1, computing device 10 comprises a display member 18 rotatably coupled to a base member 20. Display member 18 and base member 20 each comprise a housing 21 and 22, respectively, formed having a number of walls. For example, housing 22 comprises a top wall/working surface 24, a bottom wall 26, a front wall 28, a rear wall 30 and a pair of sidewalls 32 and 34.

In the embodiment illustrated in FIG. 1, cooling system 12 is disposed within housing 22 of base member 20 and is configured to dissipate and/or otherwise remove thermal energy from an internal area of base member 20 and/or thermal energy generated by one or more particular computer operational components 36 disposed within housing 22. It should be understood that all or a portion of cooling system 12 may be otherwise disposed (e.g., within display member 18 of computing device 10 or within both display member 18 and base member 20).

In the embodiment illustrated in FIG. 1, cooling system 12 comprises an airflow device or cooling fan 38, a heat dissipating element configured as a heat exchanger 40, and a heat transport element 42 thermally coupling at least one computer operational component 36 to heat exchanger 40. Heat transport element 42 may comprise any type of thermally conductive element capable of transferring heat from operational component 36 to heat exchanger 40. For example, in some embodiments, heat transport element 42 comprises a heat pipe 44 filed with a vaporizable liquid to increase heat transfer performance. In the embodiment illustrated in FIG. 1, heat exchanger 40 comprises a plurality of fins 46 to facilitate thermal energy dissipation from heat exchanger 40. In operation, ambient cooling air is directed from cooling fan 38 through heat exchanger 40 to dissipate thermal energy generated by operational component 36 and/or dissipate thermal energy otherwise generated within housing 22.

In the embodiment illustrated in FIG. 1, filter 14 system comprises a filter 15 configured to extract impurities such as sand, dust, hair, and other debris from the cooling air before the cooling air reaches heat exchanger 40 to prevent and/or substantially reduce the likelihood of buildup of impurities inside or on heat exchanger 40. In the embodiment illustrated in FIG. 1, filter 15 is disposed between cooling fan 38 and heat exchanger 40 to filter the cooling air prior to entering heat exchanger 40. However, it should be understood that filter may be otherwise located.

Figure 2:
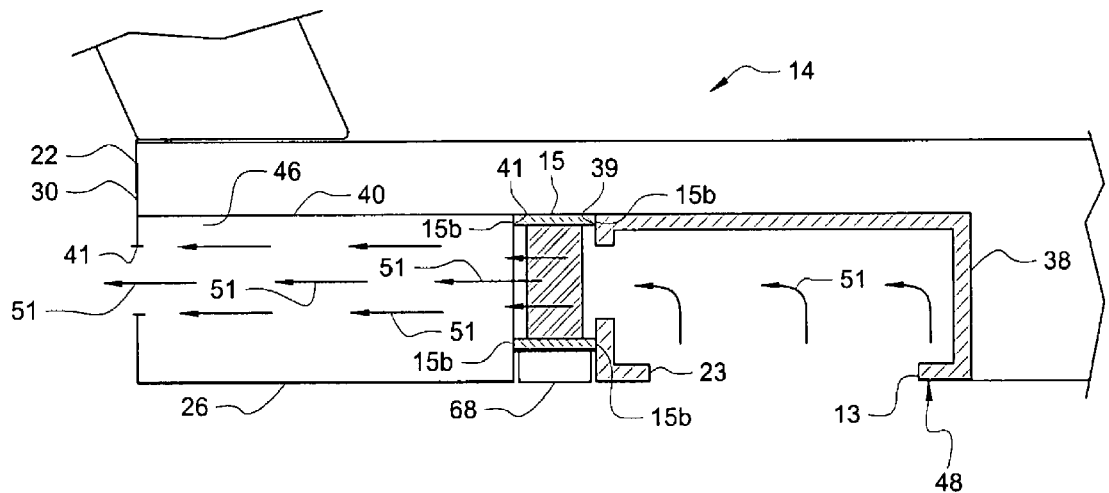
FIG. 2 is diagram of a section view of the computing device of FIG. 1 taken along the line 2-2.

FIG. 2 is diagram of a section view of computing device 10 of FIG. 1 taken along the line 2-2. In FIG. 2, heat exchanger 40 is aligned with and/or otherwise positioned near an outlet 41 in housing 22 to enable warmed cooling air to exit exchanger 40 and housing 22. In the embodiment illustrated in FIG. 2, filter 15 is disposed between an exhaust face 39 of cooling fan 38 and an intake face 41 of heat exchanger 40. However, it should be understood that filter 14 may be otherwise positioned such as, for example, adjacent an intake face 48 of cooling fan 38 or at any other position within housing 22 to filter the cooling air prior to entering heat exchanger 40.

In operation, cooling fan 38 draws ambient cooling air inside housing 22 through an inlet 23 disposed on bottom wall 26. Cooling fan 38 forces air through filter 15, thereby enabling the removal of impurities therein prior to entering heat exchanger 40. The cooling air travels through heat exchanger 40 to dissipate thermal energy carried by fins 46. The warmed cooling air exits housing 22 through outlet 41. Accordingly, cooling fan 38 creates an airflow path 51 extending between inlet 23 and outlet 41 in which filter 15 is disposed at some intermediate location along airflow path 51. For purposes herein, intermediate location shall mean located away or spaced apart from inlet 23 and outlet 41 at some position along airflow path 51, such as, for example, between exhaust face 39 of cooling fan 38 and intake face 41 of heat exchanger 40.

Figure 3:
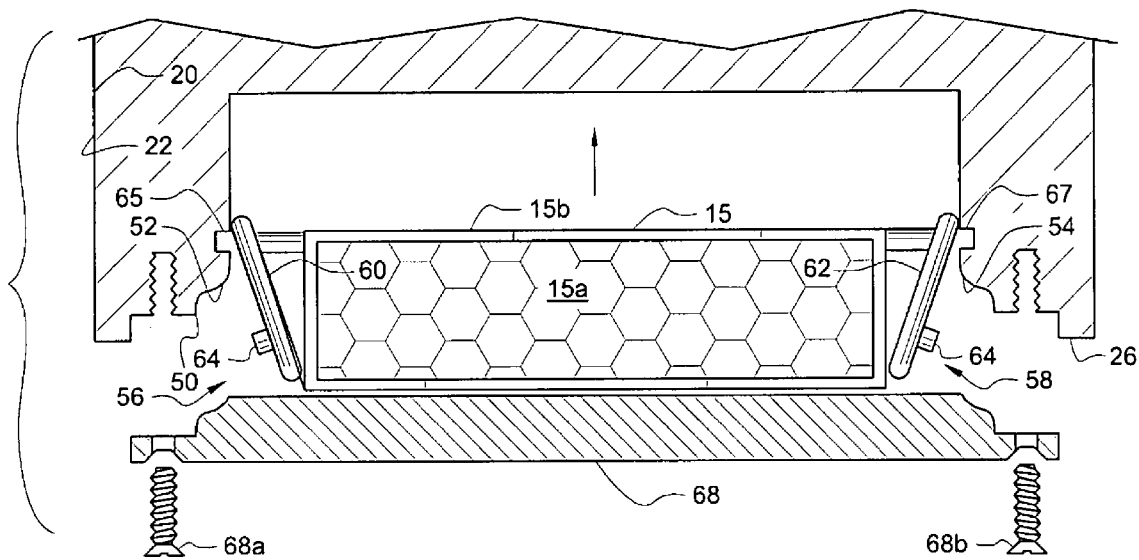
FIG. 3 is a diagram of an exploded section view of the computing device of FIG. 1 taken along the line 3-3.

FIG. 3 is diagram of a section view of the computing device of FIG. 1 taken along the line 3-3 of FIG. 1. In the embodiment illustrated in FIG. 3, base member 20 comprises an opening 50 in housing 22 such that filter 15 is readily accessible through opening 50 of housing 22 to facilitate insertion and removal of filter 15 relative to housing 22. As defined herein, the term "readily accessible" shall mean accessible without disassembling housing 22 (other than to provide access through opening 50, such as for example, removing an access door) to access filter 15. In the embodiment illustrated in FIG. 3, opening 50 comprises finger recesses 52 and 54 to provide access to ends of filter 15 to facilitate insertion and removal of filter 15 relative to housing 22.

In some embodiments, filter 15 comprises a pair of locking mechanisms 56 and 58 to securely fasten filter 15 inside housing 22. In the embodiment illustrated in FIG. 3, locking mechanisms 56 and 58 each comprise flexible arms 60 and 62 having a detent 64 and 66, respectively, for insertion within a corresponding recess 65 and 67 disposed inside housing 22. In order to disengage detents 64 and 66 from respective recesses 65 and 67 to facilitate removal of filter 15 from housing 22, a user inserts his/her finger inside finger recesses 52 and 54 and forces arms 60 and 62 inwardly and/or toward each other to remove detents 64 and 66 from their corresponding recesses 65 and 67. Once detents 64 and 66 are removed from recesses 65 and 67, filter 15 can be withdrawn from housing 22. It should be understood that other configurations of locking mechanisms 56 and 58 may be used such as, for example, utilizing only a single detent 64 or 66 any other method of securing filter 14 within housing 22. In the embodiment illustrated in FIGS. 2 and 3, base member 20 comprises an access door 68 removably coupleable to base member 20 to enclose opening 50 to reduce and/or eliminate an airflow through opening 50 while also reducing and/or eliminating the likelihood of debris entering housing 22. In FIGS. 2 and 3, access door 68 is coupleable to housing 22 via a pair of screws 68a and 68b; however, it should be understood that access door 68 may be otherwise secured to enclose opening 50. In the embodiment illustrated in FIGS. 2 and 3, opening 50 is disposed on bottom wall 26; however, it should be understood that opening 52 may be otherwise disposed (e.g., on wall 24, 28, 30, 32 and/or 34).

In the embodiments illustrated in FIGS. 2 and 3, filter 15 comprises a filter element 15a surrounded by a frame 15b. According to some embodiments, frame 15b is configured to sealingly engage exhaust face 39 and/or intake face 41 to minimize gaps and/or leaking between filter 15 and cooling fan 38 and heat exchanger 40 as cooling air flows from cooling fan 38 and heat exchanger 40.

Figure 4:
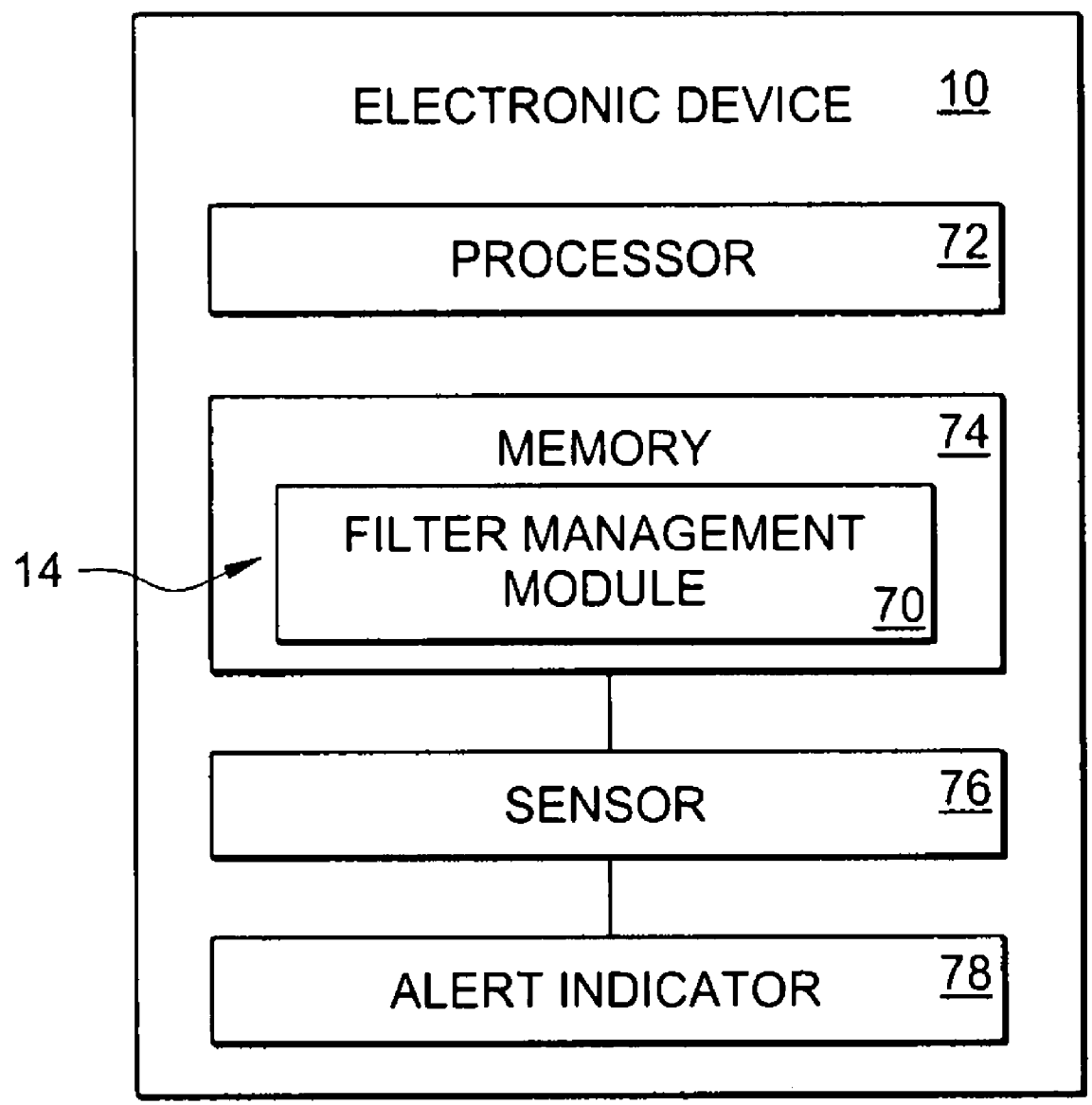
FIG. 4 is a block diagram illustrating the computing device of FIG. 1 having an embodiment of a filter management module.

FIG. 4 is a block diagram illustrating computing device 10 of FIG. 1 having an embodiment of a filter management module 70. In FIG. 4, computing device 10 comprises a processor 72 coupled to a memory 74, a sensor 76 and an alert indicator 78. In the embodiment illustrated in FIG. 4, memory 74 comprises filter management module 70. Filter management module 70 may comprise hardware, software, firmware, or a combination thereof. In FIG. 3, filter management module 70 is illustrated as being stored in memory 74 so as to be accessible and/or executable by processor 72; however, it should be understood that filter management module 70 may be otherwise stored. Filter management module 70 is used to analyze signals received from sensor 76 to determine whether filter 15 should be serviced (e.g., cleaned, repaired and/or replaced). In operation, in response to filter management module 70 receiving a signal indicating that filter 15 should be serviced, filter management module 70 sends a signal to actuate and/or otherwise turn on alert indicator 78 to notify a user of the servicing condition of filter 15.

In the embodiment illustrated in FIG. 4, sensor 76 comprises any type of sensor/device to enable filter management module 70 to determine whether filter 15 should be serviced. For example, sensor 78 may comprise a clock, timer or other mechanism configured to send a signal to filter management module 70 at predetermined intervals such as, for example, after a predetermined number of operating hours of computing device 10 or at a predetermined date intervals (e.g., at six month intervals, twelve month intervals, etc.), to enable actuation of alert indicator 70. According to another embodiment, sensor 78 may comprise a flow rate sensor (e.g., disposed within heat exchanger 40 or elsewhere) to monitor the flow rate of cooling air through heat exchanger 40. For example, in response to detecting a reduction in airflow rate through filter 15 when cooling fan 38 is operating, sensor 78 transmits a signal to filter management module 70 to cause filter management module 70 to actuate alert indicator 78 to indicate that filter 15 should be serviced. According to another embodiment, sensor 78 may comprise a thermometer to monitor the temperature inside heat exchanger 40. For example, in response to a reduction in airflow rate through filter 14 when cooling fan 38 is operating, sensor 78 detects a rise in temperature inside or proximate to heat exchanger 40 due to the reduced volume of cooling air flow cooling heat exchanger 40. In such conditions, sensor 78 sends a signal to filter management module 70 to cause filter management module 70 to actuate alert indicator 78 to indicate that filter 14 should be serviced.

Thus, embodiments of filter system 14 employ a filter 15 is to remove impurities from cooling air prior to entering heat exchanger 40 to reduce and/or eliminate the likelihood of impurities entering heat exchanger 40, thereby maintaining efficient heat dissipation by heat exchanger 40. Embodiments also provide a filter management module 70 to actuate an alert indicator 78 to indicate to a user that filter 15 should be serviced.

What is claimed is:

1. A computing device, comprising:
    a base having a cooling fan and a heat exchanger;
    a filter disposed between the heat exchanger and the cooling fan;
    a sensor that senses a condition of the filter or heating exchanger and generates a signal based on the condition; and
    a filter management module that receives and analyzes the signal to determine whether to service the filter.

2. The computing device of claim 1, wherein the filter includes a frame that sealingly engages an intake face of the heat exchanger.

3. The computing device of claim 1, wherein the signal indicates that the filter should be cleaned, repaired, or replaced.

4. The computing device of claim 1, wherein the filter management module issues an alert to service the filter upon receiving the signal from the sensor.

5. The computing device of claim 1, wherein the sensor monitors a temperature inside the heat exchanger.

6. The computing device of claim 1, wherein the filter comprises a locking mechanism that includes a pair of flexible arms to securely fasten the filter between the heat exchanger and the cooling fan.

7. The computing device of claim 1, wherein the filter is removable through an access door located in the base and opening on an exterior surface of a housing of the computing device.

8. The computing device of claim 1, wherein the sensor detects a reduction in an airflow rate through the filter and transmits the signal to the filter management module indicating the reduction in the airflow rate.

9. A notebook computer, comprising:
    a housing that includes a cooling fan, a heat exchanger, a filter that filters air from the cooling fan to the heat exchanger, a sensor that senses a condition of the filter and generates a signal in response to the condition, and a filter management module that receives the signal from the sensor indicating that the filter should be serviced, wherein the filter management module issues an alert upon detection by the sensor of an increased temperature condition associated with the heat exchanger located in the notebook computer.

10. The notebook computer of claim 9, wherein the filter is insertable adjacent to an intake face of the heat exchanger and adjacent an exhaust face of the cooling fan.

11. A notebook computer, comprising:
    a housing that includes a cooling fan, a heat exchanger, a filter that filters air from the cooling fan to the heat exchanger, a sensor that senses a condition of the filter and generates a signal in response to the condition, and a filter management module that receives the signal from the sensor indicating that the filter should be serviced, wherein the filter management module issues an alert upon detection of a reduced airflow condition through the heat exchanger located in the notebook computer.

12. The notebook computer of claim 9, wherein the filter management module issues an alert to service the filter according to a predetermined time interval determined by the sensor.

13. The notebook computer of claim 9, wherein the filter comprises a locking mechanism having a flexible arm to securely fasten the filter between the heat exchanger and the cooling fan.

14. The notebook computer of claim 9, further comprising an access door located in a base of the notebook computer, the access door opening to provide access to the filter.

15. A portable computing device, comprising:
   a cooling fan that draws an airflow through an airflow path extending from an inlet of a housing of the portable computing device to an outlet of the housing;
   a filter insertable through an opening in a wall of the housing into an intermediate location of the airflow path;
   a sensor that senses a condition of the filter and generates a signal in response to the condition; and
   a filter management module that analyzes the signal and determines when to service the filter, wherein the filter is disposed between the cooling fan and a heat exchanger and includes a frame to seal with either the heat exchanger or the cooling fan.

16. The portable computing device of claim 15, wherein the signal indicates that the filter should be cleaned, repaired, or replaced.

17. The portable computing device of claim 15, further comprising:
   a memory that stores the filter management module;
   a processor coupled to the memory, wherein the filter management module is executable by the processor.

18. The portable computing device of claim 15 wherein the sensor detects a reduction in an airflow rate through the filter and transmits the signal to the filter management module indicating the reduction in the airflow rate.

\* \* \* \* \*